United States Patent
Kim et al.

(10) Patent No.: US 11,449,733 B2
(45) Date of Patent: Sep. 20, 2022

(54) NEURAL NETWORK LEARNING METHOD AND DEVICE FOR RECOGNIZING CLASS

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Jun-mo Kim, Daejeon (KR); Byung-ju Kim, Daejeon (KR); Joo-chang Kim, Daejeon (KR); Ye-gang Lee, Daejeon (KR); Min-seok Park, Daejeon (KR); Ju-seung Yun, Daejeon (KR); Jae-young Lee, Daejeon (KR); Dong-gyu Joo, Daejeon (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 377 days.

(21) Appl. No.: 16/645,344

(22) PCT Filed: Sep. 4, 2018

(86) PCT No.: PCT/KR2018/010271
§ 371 (c)(1),
(2) Date: Mar. 6, 2020

(87) PCT Pub. No.: WO2019/050247
PCT Pub. Date: Mar. 14, 2019

(65) Prior Publication Data
US 2020/0285938 A1    Sep. 10, 2020

(30) Foreign Application Priority Data
Sep. 8, 2017 (KR) .................. 10-2017-0115451

(51) Int. Cl.
*G06K 9/62* (2022.01)
*G06N 3/04* (2006.01)
*G06T 7/136* (2017.01)

(52) U.S. Cl.
CPC ......... *G06N 3/0454* (2013.01); *G06K 9/6256* (2013.01); *G06K 9/6262* (2013.01); (Continued)

(58) Field of Classification Search
CPC ........ G06N 3/0454; G06N 3/088; G06N 3/08; G06K 9/6256; G06K 9/6262; G06T 7/136; G06T 2207/20081; G06T 2207/20084
See application file for complete search history.

(56) References Cited

U.S. PATENT DOCUMENTS 10,474,933 B2 * 11/2019 Han .................. G06K 9/6257
2007/0258648 A1   11/2007 Perronnin
(Continued)

FOREIGN PATENT DOCUMENTS

KR   10-2015-0054258 A   5/2015

OTHER PUBLICATIONS

International Search Report (PCT/ISA/210) dated Feb. 1, 2019 issued by the International Searching Authority in International Application No. PCT/KR2018/010271.
(Continued)

*Primary Examiner* — Samir A Ahmed
(74) *Attorney, Agent, or Firm* — Sughrue Mion, PLLC (57) ABSTRACT

The present disclosure provides a neural network training device for recognizing a class of an object included in an image based on an artificial intelligence (AI) system and an application thereof, the neural network training method including: acquiring, by using a first learning network model trained based on source training images respectively
(Continued)

included in at least one class, feature information of a query image included in a class different from the at least one class; obtaining a generated image from the feature information of the query image by using a second learning network model acquiring feature information of the obtained generated image by using the first learning network model; and updating weights of layers respectively included in the first and second learning network models, based on a difference between the feature information of the query image and the feature information of the generated image and on a difference between the query image and the generated image.

13 Claims, 9 Drawing Sheets

(52) U.S. Cl.
CPC .... *G06T 7/136* (2017.01); *G06T 2207/20081* (2013.01); *G06T 2207/20084* (2013.01)

(56) References Cited

U.S. PATENT DOCUMENTS

| | | |
|---|---|---|
| 2009/0148068 A1 | 6/2009 | Woodbeck |
| 2014/0328537 A1 | 11/2014 | Schertler et al. |
| 2015/0254555 A1 | 9/2015 | Williams, Jr. et al. |
| 2017/0243082 A1 | 8/2017 | Song et al. |
| 2018/0137395 A1* | 5/2018 | Han .................. G06V 40/1347 |
| 2020/0242736 A1* | 7/2020 | Liu ............................ G06T 3/60 |
| 2021/0192693 A1* | 6/2021 | Jepson ................ G06N 3/0454 |

OTHER PUBLICATIONS

Written Opinion (PCT/ISA/237) dated Feb. 1, 2019 issued by the International Searching Authority in International Application No. PCT/KR2018/010271.

* cited by examiner

NEURAL NETWORK LEARNING METHOD AND DEVICE FOR RECOGNIZING CLASS

TECHNICAL FIELD

The present disclosure relates to a neural network training method for class recognition, a neural network training device for class recognition, and a recording medium having recorded thereon a program for performing the neural network training method for class recognition.

BACKGROUND ART

An artificial intelligence (AI) system is a computer system that realizes human-level intelligence, and enables machines to become smart by learning and making decisions on their own, compared to an existing rule-based smart system. The AI system may improve its recognition rates and is capable of understanding a user's preferences more accurately through experience. Thus, existing rule-based smart systems are increasingly being replaced by deep learning-based AI systems.

AI technology consists of machine learning (deep learning) and element technologies using the machine learning.

Machine learning is an algorithmic technique for autonomously classifying/learning features of input data, and element technologies are technologies for simulating functions of a human brain such as cognition and decision-making by using machine learning algorithms and include technical fields such as linguistic understanding, visual understanding, reasoning/prediction, knowledge representation, motion control, etc.

Various technical fields to which AI technology is applied are as follows. Linguistic understanding is a technology for recognizing human language/characters for application/processing and includes natural language processing, machine translation, a dialog system, question answering, speech recognition/synthesis, etc. Visual understanding is a technology for recognizing and processing an object, in the same way as performed by a human visual system, and includes object recognition, object tracking, image retrieval, person recognition, scene understanding, spatial understanding, image enhancement, etc. Reasoning/prediction is a technology for judging information and logically inferring and predicting new information and includes knowledge/probability-based interference, optimization prediction, preference-based planning, recommendations, etc. Knowledge representation is a technology for automatically processing information about human experience as knowledge data and includes knowledge construction (data generation/classification), knowledge management (data utilization), etc. Motion control is a technology for controlling autonomous driving of a vehicle and motion of a robot and includes movement control (navigation, collision avoidance, and travelling), manipulation control (action control), etc.

DESCRIPTION OF EMBODIMENTS

Technical Problem

The present disclosure may provide a neural network training method and device for solving a catastrophic forgetting problem, which may occur when recognizing images from a previously unlearned new class, by generating additional training data from a query image in the new class via at least one learning network model and incrementally training the learning network model by using the additional training data.

Solution to Problem

The present disclosure relates to an artificial intelligence (AI) system and an application thereof for simulating functions of a human brain such as cognition and decision-making by using machine learning algorithms such as deep learning. In particular, the present disclosure provides a neural network training method for recognizing a class of an object in an image based on an artificial intelligence system and an application thereof, the neural network training method including: acquiring, by using a first learning network model trained based on source training images respectively included in at least one class, feature information of a query image included in a class different from the at least one class; obtaining a generated image from the feature information of the query image by using a second learning network model acquiring feature information of the obtained generated image by using the first learning network model; and updating weights of layers respectively included in the first and second learning network models, based on a difference between the feature information of the query image and the feature information of the generated image and on a difference between the query image and the generated image.

BEST MODE

According to an embodiment, a neural network training method for recognizing a class includes: acquiring, by using a first learning network model trained based on source training images respectively included in at least one class, feature information of a query image included in a class different from the at least one class; obtaining a generated image from the feature information of the query image by using a second learning network model acquiring feature information of the obtained generated image by using the first learning network model; and updating weights of layers respectively included in the first and second learning network models, based on a difference between the feature information of the query image and the feature information of the generated image and on a difference between the query image and the generated image.

The neural network training method may further include acquiring information about a target class, and the obtaining of the generated image may include obtaining, based on the feature information of the query image and the information about the target class, a generated image included in the target class by using the second learning network model.

The updating comprises iteratively performing the updating until the difference between the feature information of the query image and the feature information of the generated image and the difference between the query image and the generated image are acquired below thresholds respectively preset with respect to the differences therebetween.

The neural network training method for recognizing a class may further include
determining, as a training image for a recognition model for class recognition, a generated image obtained via a second learning network model acquired as a result of the iterative performing of the updating.

The acquiring of the feature information of the generated image may include acquiring feature information of a generated image having a smallest difference from the query image from among a plurality of generated images obtained based on the feature information of the query image.

The acquiring of the feature information of the generated image may include receiving, from a server, the feature information of the query image acquired by using the first learning network model stored in the server, and the neural network training method may further include transmitting, to the server, the generated image obtained using the second learning network model.

According to an embodiment, a neural network training device for recognizing a class includes: a memory storing one or more instructions; and
at least one processor configured to execute the one or more instructions stored in the memory to: acquire, by using a first learning network model trained based on source training images respectively included in at least one class, feature information of a query image included in a class different from the at least one class; obtain a generated image from the feature information of the query image by using a second learning network model; acquire feature information of the obtained generated image by using the first learning network model; and update weights of layers respectively included in the first and second learning network models, based on a difference between the feature information of the query image and the feature information of the generated image and on a difference between the query image and the generated image.

MODE OF DISCLOSURE

Terms used herein will now be briefly described and then the present disclosure will be described in detail.

The terms used in the present disclosure are general terms currently widely used in the art based on functions described in the present disclosure, but may have different meanings according to an intention of one of ordinary skill in the art, precedent cases, or advent of new technologies. Furthermore, some terms may be arbitrarily selected by the applicant, and in this case, the meaning of the selected terms will be described in detail in the detailed description of the disclosure. Thus, the terms used herein should be defined not by simple appellations thereof but based on the meaning of the terms together with the overall description of the disclosure.

It will be understood that, although the terms including an ordinal number such as "first", "second", etc. may be used herein to describe various elements, these elements should not be limited by the terms. The terms are only used to distinguish one element from another element. For example, a first element to be discussed below may be termed a second element without departing from the scope of the present disclosure. Similarly, a second element may be termed a first element. As used herein, the term "and/or" includes any and all combinations of one or more of the associated listed items.

Throughout the specification, when a part "includes" or "comprises" an element, unless there is a particular description contrary thereto, the part can further include other elements, not excluding the other elements. Furthermore, as used herein, the term "unit" denotes a software element or a hardware element such as a field-programmable gate array (FPGA) or an application-specific integrated circuit (ASIC), and performs certain functions. However, the term "unit" is not limited to software or hardware. The "unit" may be formed so as to be in an addressable storage medium, or may be formed so as to operate one or more processors. Thus, for example, the term "unit" may include elements such as software elements, object-oriented software elements, class elements and task elements, processes, functions, attributes, procedures, subroutines, segments of program code, drivers, firmware, micro-code, circuits, data, a database, data structures, tables, arrays, or variables. Functions provided by the elements and "units" may be combined into the smaller number of elements and "units", or may be divided into additional elements and "units".

Embodiments of the present disclosure will now be described more fully hereinafter with reference to the accompanying drawings so that they may be easily implemented by one of ordinary skill in the art. However, the present disclosure may have different forms and should not be construed as being limited to the descriptions set forth herein. Parts not related to the present disclosure are omitted to clarify the description of the disclosure, and like reference numerals denote like elements throughout.

Figure 1:
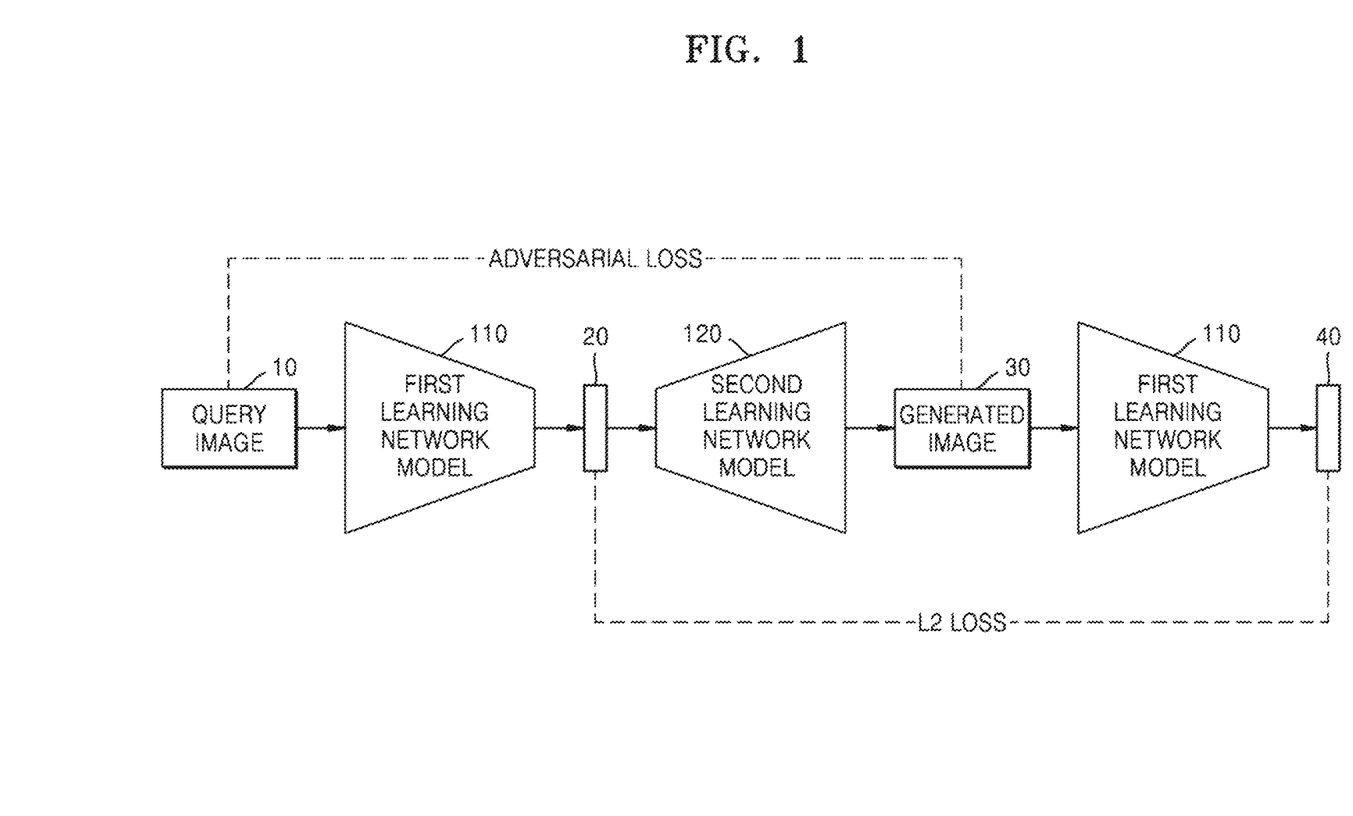
FIG. 1 is a conceptual diagram for explaining a method of training a neural network according to an embodiment.

FIG. 1 is a conceptual diagram for explaining a neural network training method according to an embodiment Referring to FIG. 1, a neural network training device (hereinafter, referred to as a 'device') may generate a training image necessary to train a neural network-based recognition model for class recognition. In the present specification, for convenience of description, an existing training image used to train at least one neural network constituting a recognition model is described as a source training image, and an additionally input training image in a new class is described as a generated image.

A class refers to a type of an object included in an image, and there may be various classes according to a category. For example, classes may be types of numbers such as 0, 1, 2, 3, 4, and 5 or species of animals such as a puppy and a cat, respectively. As another example, classes may be kinds of languages such as Korean, English, and Japanese, respectively.

According to an embodiment, the device may aim to train a model capable of eventually recognizing images from all classes by sequentially training the model with respect to images from various classes. However, when a pre-generated network model is continuously trained, learning an image in a new class may cause forgetting of the learned information such as previously learned weights of a layer. This problem may also be called catastrophic forgetting.

According to an embodiment, to overcome catastrophic forgetting, i.e., to minimize overfitting to the knowledge learned by a pre-generated learning network model due to a query image 10 for a new class, when the query image 10 for the new class is input, the device may obtain a generated image 30, which reflects a class previously learned by a learning network model while preserving features of the query image 10.

In detail, the device may store a first learning network model 110 and a second learning network model 120 for obtaining the generated image 30 from the query image 10. In this case, the first and second learning network models 110 and 120 are merely an example, and the device may store two or more learning network models for obtaining the generated image 30. Furthermore, the first and second learning network models 110 and 120 may be described as an encoder and a decoder, respectively.

The device may extract feature information 20 of the query image 10 by using the first learning network model 110. For example, the feature information 20 may include colors that make up the query image 10 and an edge, a polygon, saturation, brightness, a color temperature, blur, sharpness, and contrast of the query image 10, but is not limited thereto.

Furthermore, the device may obtain the generated image 30 from the feature information 20 by using the second learning network model 120. Here, because the generated image 30 is obtained based on the feature information 20 of the query image 10, the generated image 30 may have a class of a source training image previously used for training while having features corresponding to the query image 10.

According to an embodiment, the second learning network model 120 may be a generative model. A generative model is a model for generating a new input with the same characteristics as input data for class recognition and, for example, a model that has learned an image of a specific class may generate an image having the same style as the image of the specific class.

The device may acquire feature information 40 of the generated image 30 by applying the generated image 30 as input to the first learning network model 110.

The device may acquire adversarial loss that is information about a difference between the query image 10 and the generated image 30 and L2 loss that is information about the feature information 20 of the query image 10 and the feature information 40 of the generated image 30. The device may train the first and second learning network models 110 and 120 by iteratively performing the series of processes to reduce the adversarial loss and L2 loss and updating parameters of layers respectively included in the first and second learning network models 110 and 120.

In other words, the device may incrementally learn a class by using the second learning network model 120 that is a generative model. In this case, incremental class learning is a process of forming one or more conceptual hypotheses and then progressively improving the hypothesis with additional examples and is a learning method including creating new knowledge from the current example and a negative example and evolving to progressively revise the current knowledge as a new example and a negative example appear.

Furthermore, the device may select, based on the adversarial loss and L2 loss, a generated image closest to a source training image from among obtained generated images by using a classifier, and use the generated image for training the first and second learning network models 110 and 120. For example, when a conditional generative adversarial network (GAN) algorithm is used, the device may train the second learning network model 120 that is a generative model by adding a constraint that matches output data of the discriminator for each condition with a classifier result. Here, the classifier may be configured as a neural network trained to recognize a class of an object included in an input image.

According to the above-described embodiment, the device may obtain a generated image having various pieces of feature information of the query image 10 while reflecting the existing class and train a recognition model, thereby increasing accuracy of class recognition. Furthermore, the device may train the classifier to recognize a new class by using the obtained generated image together with a query image of a new class.

Figure 2:
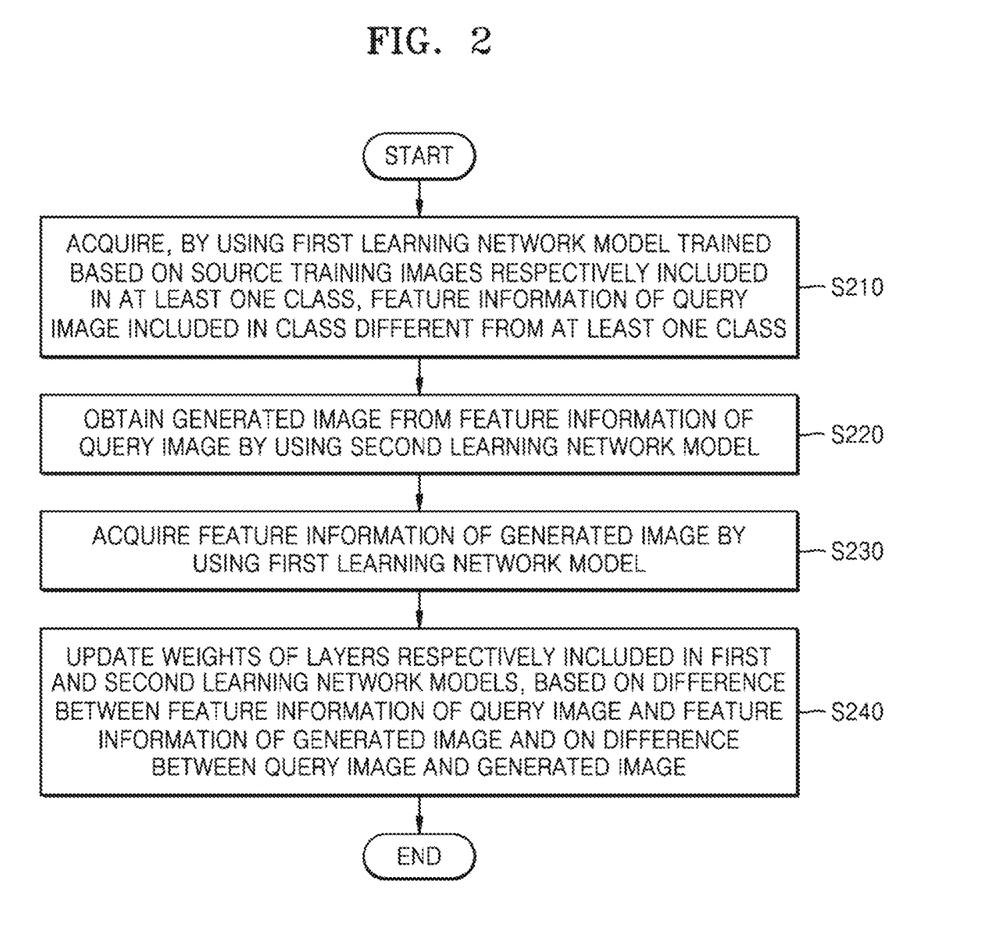
FIG. 2 is a flowchart of a method, performed by a device, of training a neural network for class recognition, according to an embodiment.

FIG. 2 is a flowchart of a method, performed by a device, of training a neural network for class recognition, according to an embodiment.

In operation S210, by using a first learning network model trained based on source training images respectively included in at least one class, the device may acquire feature information of a query image included in a class different from the at least one class.

According to an embodiment, the first learning network model may be composed of at least one layer for extracting feature information from an input image. Furthermore, weights of at least one layer in the first learning network model are assumed to be pre-learned based on a previously input source training image.

Moreover, the device may obtain a query image belonging to a class different from that of the source training image previously used for training. The device may input the query image to the first learning network model and acquire feature information of the query image as output data.

In operation S220, the device may obtain a generated image from the feature information of the query image by using a second learning network model.

The generated image may be an image in a class corresponding to the class of the existing source training image as the generated image is obtained using the second learning network model trained based on the existing source training image. However, this is merely an embodiment, and the class of the generated image may be different from that of the source training image. Furthermore, the generated image may have feature information corresponding to the feature information of the query image.

In operation S230, the device may acquire feature information of the obtained generated image by using the first learning network model.

The device may input the generated image obtained using the second learning network model back to the first learning network model. The device may acquire feature information of the generated image by using a plurality of layers in the first learning network model.

In operation S240, the device may update weights of layers respectively included in the first and second learning network models, based on a difference between the feature information of the query image and the feature information of the generated image and on a difference between the query image and the generated image.

In this case, the difference between the feature information of the query image and the feature information of the generated image may be represented as L2 loss. Furthermore, the difference between the query image and the generated image may be represented as adversarial loss. However, this is merely an example, and information about the difference between the feature information of the query image and the feature information of the generated image and information about the difference between the query image and the generated image are not limited to the L2 loss and adversarial loss, respectively.

The device may train the first and second learning network models by iteratively performing operations S210 through S240 until a time point when the L2 loss and the adversarial loss each fall below a preset threshold.

According to an embodiment, the device may extract features from a query image in a new class instead of simply remembering previously learned information and additionally use another training image having the extracted features in training, thereby improving performance of a learning network model.

Figure 3:
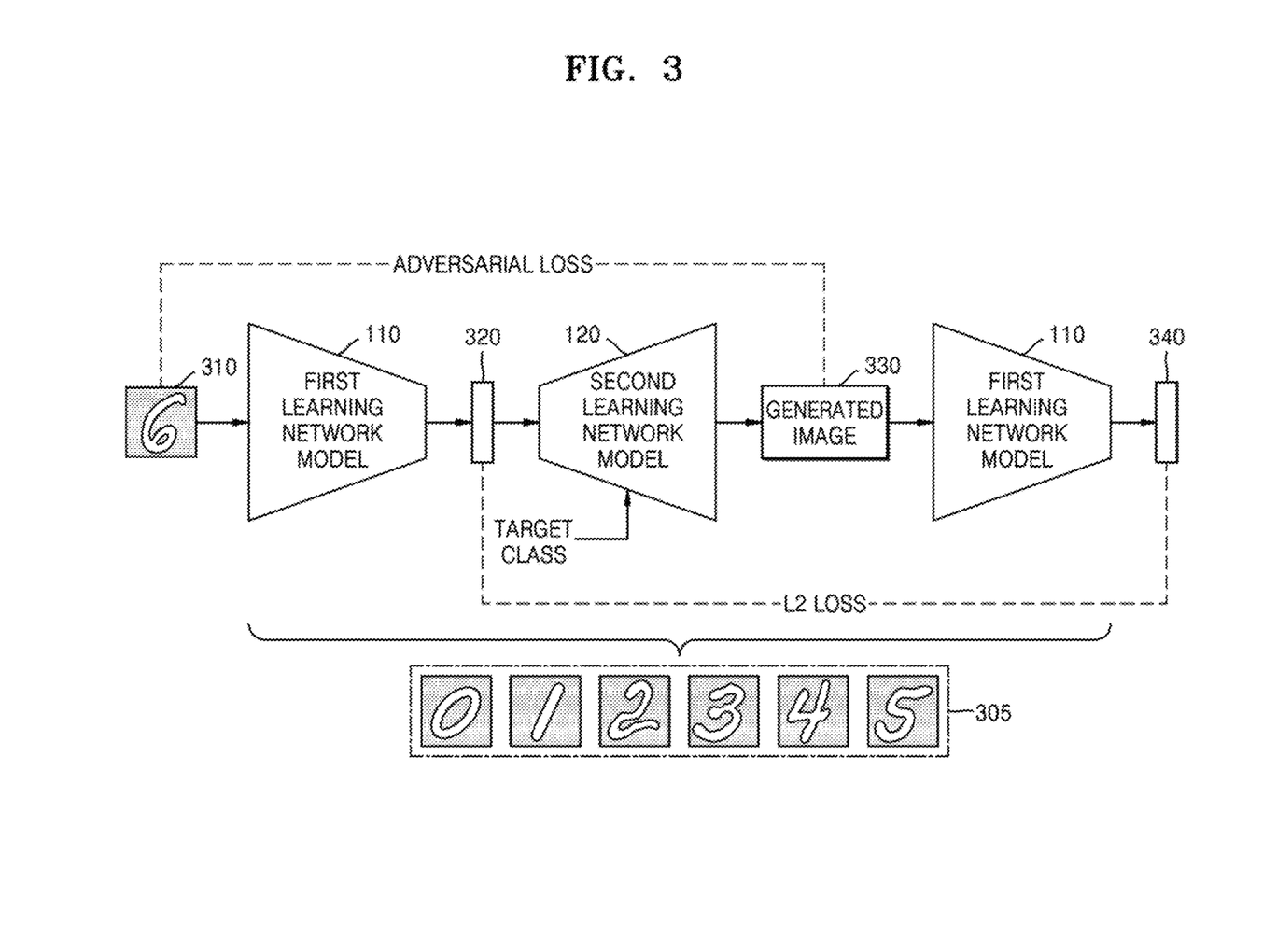
FIG. 3 is a diagram for explaining a method, performed by a device, of obtaining a generated image for recognizing a numeric class, according to an embodiment.

FIG. 3 is a diagram for explaining a method, performed by a device, of obtaining a generated image for recognizing a numeric class, according to an embodiment.

Referring to FIG. 3, the device may store first and second learning network models 110 and 120 trained based on source training images 305 for numbers 1 through 5. Furthermore, in the present embodiment, a class may mean a type of a number. For example, as each of the first and second learning network models 110 and 120 is trained based on source training images respectively having classes of 0, 1, 2, 3, 4, and 5, weights in layers constituting each of the first and second learning network models 110 and 120 may be set to recognize the numbers 0, 1, 2, 3, 4, and 5.

Moreover, the device may obtain a query image 310 of a number 6 that is a new class. The device may acquire feature information 320 of the query image 310 of the number 6 by using the first learning network model 110. The device may obtain a generated image 330 from the feature information 320 of the query image 310 of number 6 by using the second learning network model 120. Here, the generated image 330 may have a class corresponding to any one of the source training images 305 for the numbers 0 to 5.

According to another embodiment, the device may input information about a target class to the second learning network model 120. In this case, the target class represents a class of the generated image 330 according to a user's intention or the like, and may be selected as any one of classes previously learned by the second learning network model 120.

Furthermore, the device may obtain, based on information about the target class and the feature information 320 of the query image 310 of the number 6, the generated image 330 by using the second learning network model 120. When the target class is 5, the generated image 330 generated via the second learning network model 120 may be an image belonging to a class of 5 while preserving features corresponding to the feature information 320 for the number 6.

According to an embodiment, the device may acquire feature information 340 of the generated image 330 by inputting the obtained generated image 330 to the first learning network model 110.

Furthermore, the device may update weights in layers respectively constituting the first and second learning network models, based on adversarial loss corresponding to a difference between the query image 310 and the generated image 330 and on L2 loss corresponding to a difference between the feature information 320 of the query image 310 and the feature information 340 of the generated image 330.

Figure 4:
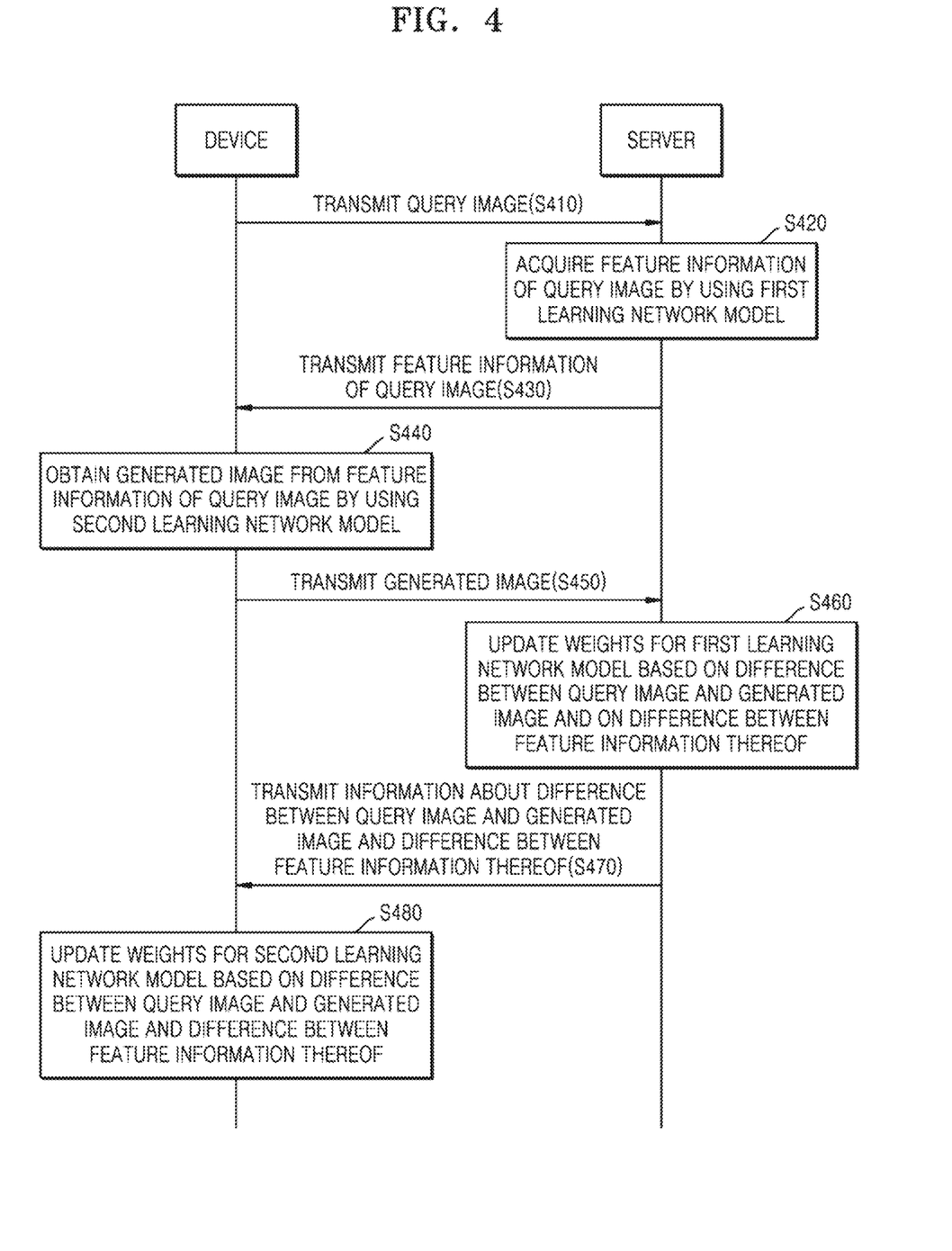
FIG. 4 is a flowchart of a method, performed by a device and a server, of training a neural network for class recognition, according to an embodiment.

FIG. 4 is a flowchart of a method, performed by a device and a server, of training a neural network for class recognition, according to an embodiment.

In operation S410, the device may transmit a query image to the server. The device may obtain a query image corresponding to a class different from that of a source training image used as a reference in training first and second learning network models. After obtaining the query image, the device may transmit the query image to the server.

In operation S420, the server may acquire feature information of the query image by using a first learning network model.

The first learning network model for extracting feature information from an input image may be stored in the server. After receiving the query image from the device, the server may acquire feature information from the query image by using the first learning network model.

In operation S430, the server may transmit the feature information of the query image to the device.

In operation S440, the device may obtain a generated image from the feature information of the query image by using a second learning network model.

According to an embodiment, the device may obtain a generated image reflecting an existing class of a source training image while preserving features corresponding to the feature information of the query image.

In operation S450, the device may transmit the generated image to the server.

In operation S460, the server may update weights in the first learning network model based on a difference between the query image and the generated image and on a difference between the feature information of the query image and feature information of the generated image.

The server may update weights for the first learning network model in such a manner as to reduce the difference between the query image and the generated image and the difference between the feature information of the query image and the feature information of the generated image.

In operation S470, the server may transmit pieces of information about the difference between the query image and the generated image and the difference between the feature information of the query image and the feature information of the generated image.

In operation S480, the device may update weights for the second learning network model based on the difference between the query image and the generated image and the difference between the feature information of the query image and the feature information of the generated image.

The device may update weights for the second learning network model in such a manner as to reduce the differences between the query image and the generated image and between the feature information of the query image and the feature information of the generated image.

Figure 5:
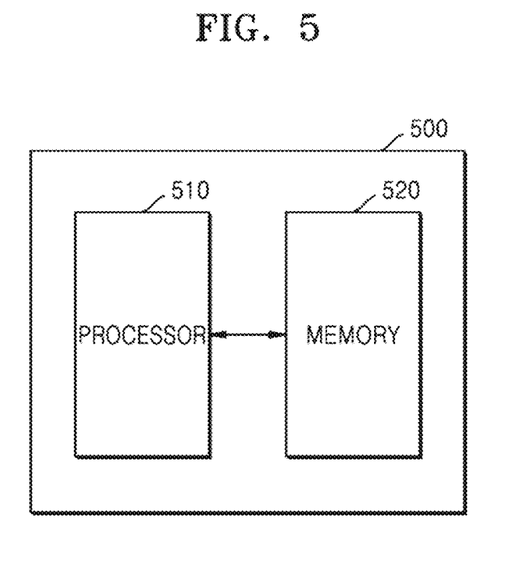
FIGS. 5 and 6 are block diagrams of a neural network training device for recognizing a class, according to an embodiment.
Figure 6:
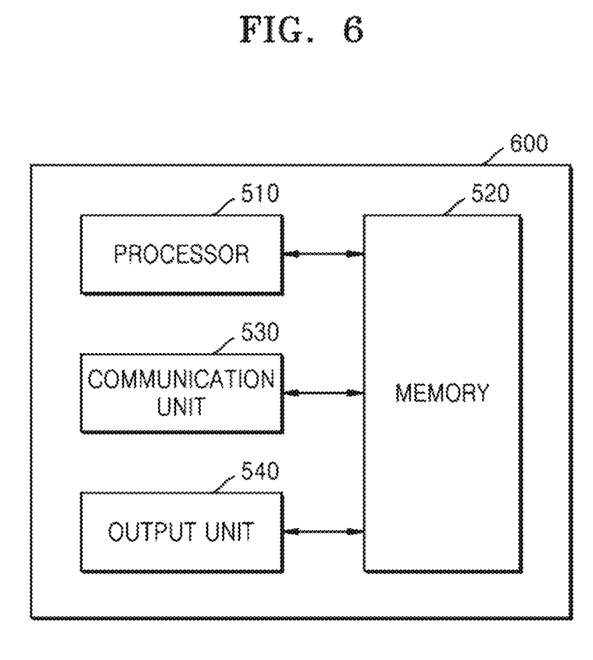

FIGS. 5 and 6 are block diagrams of a neural network training device 500 for recognizing a class, according to an embodiment.

Referring to FIG. 5, the neural network training device 500 (hereinafter, referred to as a 'device') may include a processor 510 and a memory 520. However, this is merely an embodiment, and the device 500 may include fewer or more components than the processor 510 and the memory 520. For example, referring to FIG. 6, a device 600 according to another embodiment may further include a communication unit 520 and an output unit 540 in comparison to the processor 510 and the memory 520. Furthermore, as another example, the device 500 may include a plurality of processors.

The processor 510 may include one or more cores (not shown), a graphics processor (not shown), and/or a connection path (e.g., a bus, etc.) via which signals are exchanged with other components.

The processor 510 may include one or more cores (not shown), a graphics processor (not shown), and/or a connection path (e.g., a bus, etc.) via which signals are exchanged with other components.

According to an embodiment, the processor 510 may perform the operations of the device described with reference to FIGS. 1 through 4.

For example, by using a first learning network model trained based on source training images respectively included in at least one class, the processor 510 may acquire feature information of a query image included in a class different from the at least one class. The processor 510 may obtain a generated image from the feature information of the query image by using a second learning network model. The processor 510 may acquire feature information of the obtained generated image by using the first learning network model.

Furthermore, the processor 510 may acquire pieces of information about a difference between the feature information of the query image and the feature information of the generated image and a difference between the query image and the generated image. The processor 510 may update, based on the acquired pieces of information about the differences, parameters of at least one layer included in each of the first and second learning network models.

According to an embodiment, the processor 510 may acquire information about a target class. Furthermore, the processor 510 may obtain a generated image in the target class by using the second learning network model, based on the feature information of the query image and the information about the target class.

The processor 510 may iteratively perform the update operation until the difference between the query image and the generated image and the difference between the feature information of the query image and the feature information of the generated image are acquired below thresholds respectively preset with respect to the differences therebetween.

In addition, the processor 510 may further include random access memory (RAM) (not shown) and read-only memory (ROM) (not shown) for temporarily and/or permanently storing signals (or data) processed therein. Furthermore, the processor 510 may be implemented as a system on chip (SOC) including at least one of a graphics processor, RAM, and ROM.

The memory 520 may store programs (one or more instructions) necessary for processing or control by the processor 510. Programs stored in the memory 520 may be classified into a plurality of modules according to their functions. According to an embodiment, the memory 520 including a data learning unit and a data identification unit to be described later with reference to FIG. 7 may be implemented as a software module. Furthermore, the data learning unit and the data identification unit may each independently include a learning network model or share a single learning network model.

The communication unit 530 may include one or more components that enable communication with an external servicer (e.g., the server of FIG. 4) and other external devices. The communication unit 530 may receive, from a server, feature information of a query image, acquired via a first learning network model stored in the server. Furthermore, the communication unit 530 may transmit a generated image obtained via a second learning network model based on the feature information of the query image.

The output unit 540 may output the obtained generated image. Furthermore, the output unit 540 may output pieces of information about a difference between the feature information of the query image and feature information of the generated image and a difference between the query image and the generated image.

In addition, for example, the device 500 may be a PC, a laptop, a mobile phone, a micro server, a global positioning system (GPS), a smartphone, a wearable terminal, an electronic book terminal, home appliances, electronic devices in a car, or other mobile or non-mobile computing devices. However, embodiments are not limited thereto, and the device 500 may include any type of device having a data processing function.

Figure 7:
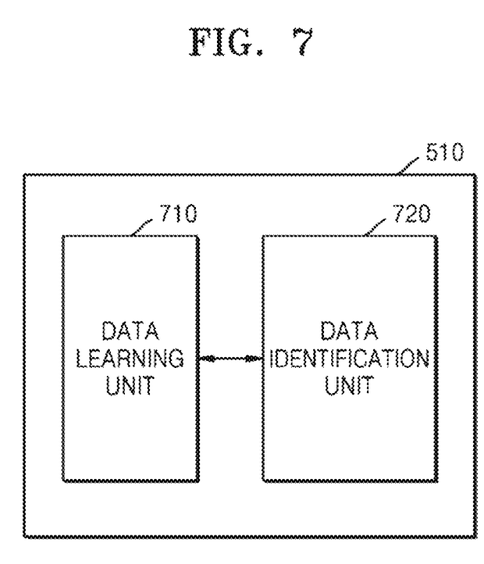
FIG. 7 is a diagram for explaining a processor according to an embodiment.

FIG. 7 is a diagram for explaining the processor 510 according to an embodiment.

Referring to FIG. 7, according to an embodiment, the processor 510 may include a data learning unit 710 and a data identification unit 720.

The data learning unit 710 may learn criteria for acquiring feature information based on an image. For example, the data learning unit 710 may learn criteria for acquiring feature information from at least one of a source training image, a query image, and a generated image. In this case, weights in at least one layer included in the data learning unit 710 may be determined according to the learned criteria.

The data identification unit 720 may extract, based on the criteria learned by the data learning unit 710, pieces of feature information respectively regarding a plurality of images or recognize a class of an object in each of the plurality of images.

At least one of the data learning unit 710 and the data identification unit 720 may be fabricated in the form of at least one hardware chip and mounted in a neural network training device. For example, at least one of the data learning unit 710 and the data identification unit 720 may be manufactured in the form of a dedicated hardware chip for AI or as a part of an existing general-purpose processor (e.g., a central processing unit (CPU) or application processor) or a dedicated graphics processor (e.g., a graphics processing unit (GPU)), and may be mounted in the above-described various types of neural network training devices.

In this case, the data learning unit 710 and the data identification unit 720 may be mounted in one neural network training device, or be respectively mounted in different neural network training devices. For example, one of the data learning unit 710 and the data identification unit 720 may be included in a device while the other may be included in a server. Furthermore, the data learning unit 710 and the data identification unit 720 are connected to each other by wire or wirelessly, such that model information generated by the data learning unit 710 may be provided to the data identification unit 720, and data input to the data identification unit 720 may be provided to the data learning unit 710 as additional training data.

In addition, at least one of the data learning unit 710 and the data identification unit 720 may be implemented as a software module. When the at least one of the data learning unit 710 and the data identification unit 720 is implemented as a software module (or a program module including instructions), the software module may be stored in non-transitory computer readable recording media. Furthermore, in this case, at least one software module may be provided by an operating system (OS) or a predetermined application. Alternatively, some of the at least one software module may be provided by the OS while the rest thereof may be provided by the predetermined application.

Figure 8:
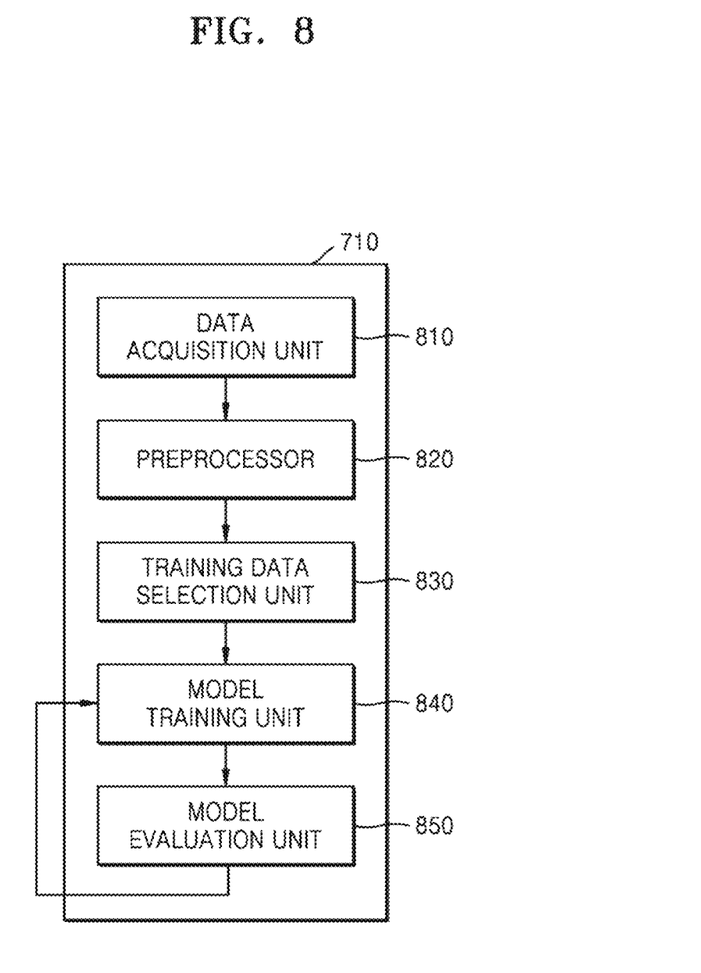
FIG. 8 is a block diagram of a data learning unit according to an embodiment.

FIG. 8 is a block diagram of the data learning unit 710 according to an embodiment.

Referring to FIG. 8, according to some embodiments, the data learning unit 710 may include a data acquisition unit 810, a preprocessor 820, a training data selection unit 830, a model training unit 840, and a model evaluation unit 850. However, this is merely an embodiment, and the data learning unit 710 may include fewer components than the above-described components or may further include other components in comparison to the above-described components.

The data acquisition unit 810 may acquire at least one of a source training image and a query image as a training image. For example, the data acquisition unit 810 may acquire at least one image from a neural network training device including the data learning unit 710 or an external device or server that can communicate with the neural network training device including the data learning unit 710.

Furthermore, the data acquisition unit 810 may obtain a generated image based on feature information of a query image by using the first and second learning network models described above with reference to FIGS. 1 through 4.

In addition, according to an embodiment, the at least one image acquired by the data acquisition unit 810 may be one of images classified according to a class. For example, the data acquisition unit 810 may perform training based on images classified according to a category.

The preprocessor 820 may preprocess the acquired image such that the acquired image may be used for extraction of feature information of the image or training for recognition of a class of an object in the image. The preprocessor 820 may process the at least one image acquired for training into a preset format such that the model training unit 840 to be described later may use the at least one image.

The training data selection unit 830 may select an image necessary for training from among the preprocessed images. The selected image may be provided to the model training unit 840. The training data selection unit 830 may select an image necessary for training from among the preprocessed images according to set criteria.

The model training unit 840 may learn a criterion with respect to which information is used to acquire feature information from an image or recognize an object in an image for a plurality of layers in a learning network model. For example, the model training unit 840 may learn a criterion with respect to which feature information should be extracted from a query image or according to which a generated image is to be obtained from the extracted feature information in order to obtain the generated image that is close to a source training image.

According to various embodiments, when a plurality of data recognition models are previously created, the model training unit 840 may determine a data recognition model having a high correlation between input training data and basic training data as a data recognition model to be trained. In this case, the basic training data may be pre-classified according to the type of data, and the data recognition model may be previously created for each data type. For example, the basic training data may be pre-classified based on various criteria such as an area where the training data is generated, a time when the training data is generated, a size of the training data, a genre of the training data, a creator of the training data, the type of an object in the training data, etc.

Furthermore, the model training unit 840 may train a data generation model by using reinforcement learning that uses a feedback regarding whether a class recognized via training is correct.

In addition, after the data generation model is trained, the model training unit 840 may store the trained data generation model. In this case, the model training unit 840 may store the trained data generation model in a memory of the neural network training device including the data acquisition unit 810. Alternatively, the model training unit 840 may store the trained data generation model in a memory of a server connected by wire or wirelessly to the neural network training device.

In this case, for example, the memory the trained data generation model is stored may store together an instruction or data related to at least one of the other components of the neural network training device. Furthermore, the memory may also store software and/or programs. For example, the programs may include a kernel, middleware, an application programming interface (API) and/or an application program (or "application").

The model evaluation unit 850 may input evaluation data to the data generation model and may cause the model training unit 840 to train again the data generation model when a result of generating additional training data as an output from the evaluation data does not satisfy a predetermined criterion. In this case, the evaluation data may be preset data for evaluating the data generation model. Here, the evaluation data may include a difference between a query image and a generated image obtained based on a learning network model, a difference between feature information of the generated image and feature information of the query image, etc.

In addition, when a plurality of learning network models exist, the model evaluation unit 850 may evaluate whether each of the learning network models satisfies a predetermined criterion and determine a learning network model satisfying the predetermined criterion as a final learning network model.

In addition, at least one of the data acquisition unit 810, the preprocessor 820, the training data selection unit 830, the model training unit 840, and the model evaluation unit 850 included in the data learning unit 710 may be fabricated in the form of at least one hardware chip that may be mounted in the neural network training device. For example, the at least one of the data acquisition unit 810, the preprocessor 820, the training data selection unit 830, the model training unit 840, and the model evaluation unit 850 may be manufactured in the form of a dedicated hardware chip for AI or as a part of an existing general-purpose processor (e.g., a CPU or application processor) or a dedicated graphics processor (e.g., a GPU), and may be mounted in the above-described various types of neural network training devices.

Furthermore, the data acquisition unit 810, the preprocessor 820, the training data selection unit 830, the model training unit 840, and the model evaluation unit 850 may be mounted in one neural network training device, or be respectively mounted in different neural network training devices. For example, some of the data acquisition unit 810, the preprocessor 820, the training data selection unit 830, the model training unit 840, and the model evaluation unit 850 may be included in the neural network training device while the rest thereof may be included in a server.

In addition, at least one of the data acquisition unit 810, the preprocessor 820, the training data selection unit 830, the model training unit 840, and the model evaluation unit 850 may be implemented as a software module. When the at least one of the data acquisition unit 810, the preprocessor 820, the training data selection unit 830, the model training unit 840, and the model evaluation unit 850 is implemented as a software module (or a program module including instructions), the software module may be stored in non-transitory computer readable recording media. Furthermore, in this case, at least one software module may be provided by an OS or a predetermined application. Alternatively, some of the at least one software module may be provided by the OS while the rest thereof may be provided by the predetermined application.

Figure 9:
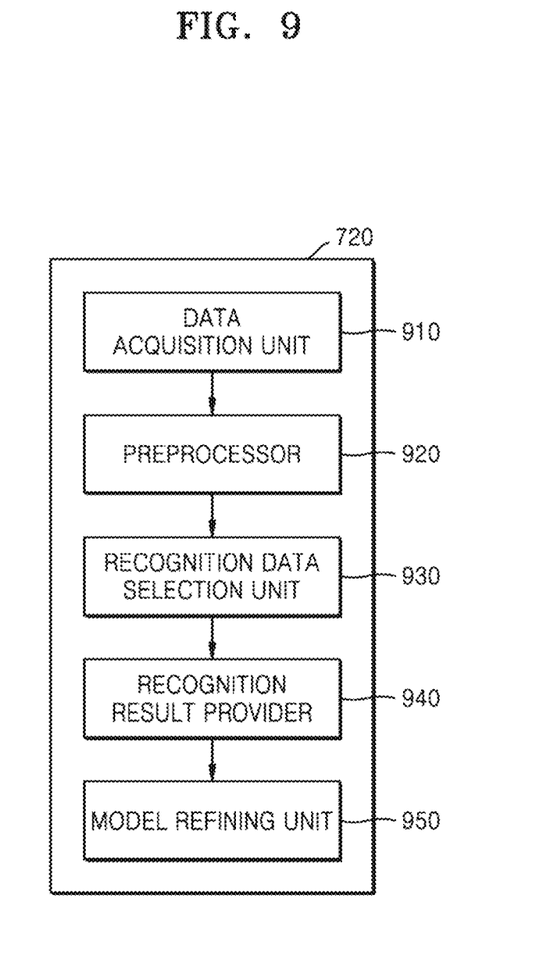
FIG. 9 is a block diagram of a data identification unit according to an embodiment.

FIG. 9 is a block diagram of the data identification unit 720 according to an embodiment.

Referring to FIG. 9, according to some embodiments, the data identification unit 720 may include a data acquisition unit 910, a preprocessor 920, a recognition data selection unit 930, a recognition result provider 940, and a model refining unit 950.

The data acquisition unit 910 may acquire at least one image necessary for extracting feature information of an image or recognizing an object in the image, and the preprocessor 920 may preprocess the at least one acquired image such that the at least one acquired image may be used for the extraction of feature information of the image or recognition of a class of the object in the image. The preprocessor 920 may process the acquired image into a preset format such that the recognition result provider 940 to be described later may use the acquired image for extraction of feature information of an image and recognition of a class of an object in the image. The recognition data selection unit 930 may select an image necessary for feature extraction or class recognition from among the preprocessed images. The selected image may be provided to the recognition result provider 940.

The recognition result provider 940 may extract feature information of an image or recognize an object in the image by applying the selected image to a learning network model according to an embodiment. A method of extracting feature information or recognizing an object by inputting at least one image to a learning network model may correspond to the method described above with reference to FIGS. 1 through 4.

The recognition result provider 940 may provide a result of recognizing a class of an object included in at least one image.

The model refining unit 950 may provide information about evaluation of a result of recognizing a class of an object in an image, which is provided by the recognition result provider 940, to the model training unit 840 described above with reference to FIG. 8, so as to modify and refine parameters for at least one feature extraction layer or a class classification network included in a learning network model.

In addition, at least one of the data acquisition unit 910, the preprocessor 920, the recognition data selection unit 930, the recognition result provider 940, and the model refining unit 950 included in the data identification unit 720 may be fabricated in the form of at least one hardware chip that may be mounted in the neural network training device. For example, the at least one of the data acquisition unit 910, the preprocessor 920, the recognition data selection unit 930, the recognition result provider 940, and the model refining unit 950 may be manufactured in the form of a dedicated hardware chip for AI or as a part of a conventional general-purpose processor (e.g., a CPU or application processor) or a dedicated graphics processor (e.g., a GPU), and may be mounted in the above-described various types of neural network training devices.

Furthermore, the data acquisition unit 910, the preprocessor 920, the recognition data selection unit 930, the recognition result provider 940, and the model refining unit 950 may be mounted in one neural network training device, or be respectively mounted in different neural network training devices. For example, some of the data acquisition unit 910, the preprocessor 920, the recognition data selection unit 930, the recognition result provider 940, and the model refining unit 950 may be included in the neural network training devices while the rest thereof may be included in a server.

In addition, at least one of the data acquisition unit 910, the preprocessor 920, the recognition data selection unit 930, the recognition result provider 940, and the model refining unit 950 may be implemented as a software module. When the at least one of the data acquisition unit 910, the preprocessor 920, the recognition data selection unit 930, the recognition result provider 940, and the model refining unit 950 is implemented as a software module (or a program module including instructions), the software module may be stored in non-transitory computer readable recording media. Furthermore, in this case, at least one software module may be provided by an OS or predetermined application. Alternatively, some of the at least one software module may be provided by the OS while the rest thereof may be provided by the predetermined application.

Figure 10:
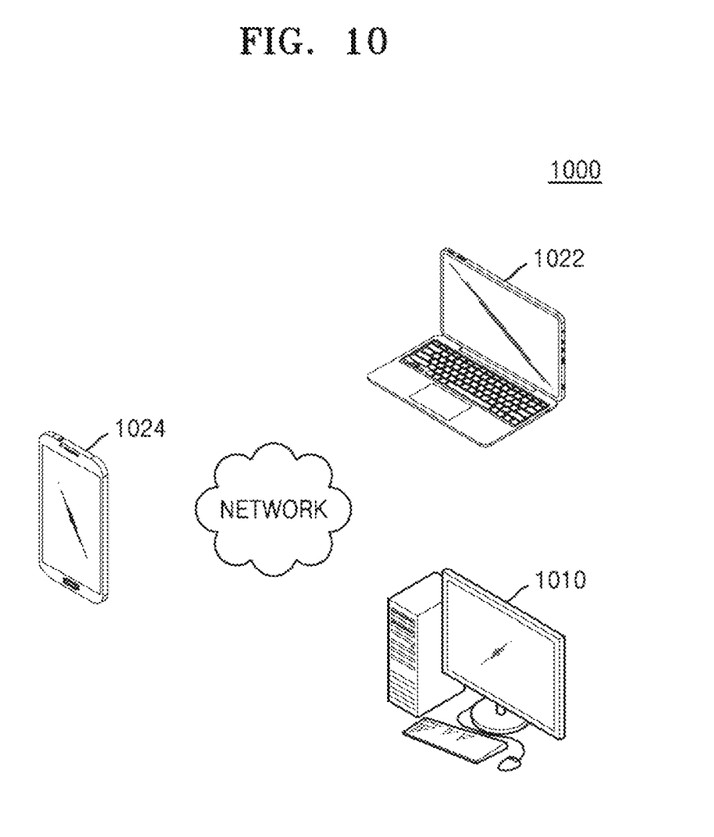
FIG. 10 is a diagram for explaining a method, performed by a server, of integrating second learning network models generated by a plurality of devices, according to an embodiment.

FIG. 10 is a diagram for explaining a method, performed by a server 1010, of integrating second learning network models generated by a plurality of devices, i.e., first and second devices 1022 and 1024, according to an embodiment.

Referring to FIG. 10, a neural network training system 1000 may include the first and second devices 1022 and 1024 and the server 1010. However, this is merely an example, and components of the neural network training system 1000 are not limited to the above example. For example, the neural network training system 1000 may consist of a plurality of servers and a plurality of devices.

The first and second devices 1022 and 1024 may each store a second learning network model, as described above with reference to FIG. 4. The first device 1022 may provide a query image to the server 1010 and receive from the server 1010 feature information of the query image, acquired via a first learning network model. The first device 1022 may obtain a generated image by using a second learning network model, based on the feature information of the query image.

Furthermore, the second device 1024 may also obtain a generated image by performing an operation corresponding to the above-described operation of the first device 1022.

In addition, according to an embodiment, the first and second devices 1022 and 1024 may provide the server 1010 with the obtained generated images and second learning network models updated according to the obtained generated images.

According to an embodiment, the server 1010 may create a new learning network model capable of recognizing various classes, based on additional training data and the second learning network models respectively generated by the first and second devices 1022 and 1024.

The embodiments of the present disclosure may be written as programs executable on a computer and may be implemented in general-use digital computers that execute the programs using a computer-readable recording medium. Examples of the computer-readable recording medium include storage media such as magnetic storage media (e.g., ROM, floppy disks, hard disks, etc.), optical recording media (e.g., CD-ROMs or DVDs), and carrier waves (e.g., transmission through the Internet).

While embodiments of the present disclosure have been described with reference to the figures, those of ordinary skill in the art will appreciate that the present disclosure may be implemented in other specific forms without departing from the technical spirit or essential characteristics thereof. Accordingly, the above embodiments and all aspects thereof are examples only and are not limiting.

The invention claimed is:

1. A neural network training method for recognizing a class, the neural network training method comprising:
   acquiring, by using a first learning network model trained based on source training images respectively included in at least one class, feature information of a query image included in a class different from the at least one class;
   obtaining a generated image from the feature information of the query image by using a second learning network model;
   acquiring feature information of the obtained generated image by using the first learning network model; and
   updating weights of layers respectively included in the first and second learning network models, based on a difference between the feature information of the query image and the feature information of the generated image and on a difference between the query image and the generated image.

2. The neural network training method of claim 1, further comprising acquiring information about a target class,
   wherein the obtaining of the generated image comprises obtaining, based on the feature information of the query image and the information about the target class, a generated image included in the target class by using the second learning network model.

3. The neural network training method of claim 1, wherein the updating comprises iteratively performing the updating until the difference between the feature information of the query image and the feature information of the generated image and the difference between the query image and the generated image are acquired below thresholds respectively preset with respect to the differences therebetween.

4. The neural network training method of claim 3, further comprising determining, as a training image for a recognition model for class recognition, a generated image obtained via a second learning network model acquired as a result of the iterative performing of the updating.

5. The neural network training method of claim 1, wherein the acquiring of the feature information of the generated image comprises acquiring feature information of a generated image having a smallest difference from the query image from among a plurality of generated images obtained based on the feature information of the query image.

6. The neural network training method of claim 1, wherein the acquiring of the feature information of the generated image comprises receiving, from a server, the feature information of the query image acquired by using the first learning network model stored in the server,
   the neural network training method further comprising transmitting, to the server, the generated image obtained using the second learning network model.

7. A neural network training device for recognizing a class, the neural network training device comprising:
   a memory storing one or more instructions; and
   at least one processor configured to execute the one or more instructions stored in the memory to:
   acquire, by using a first learning network model trained based on source training images respectively included in at least one class, feature information of a query image included in a class different from the at least one class;
   obtain a generated image from the feature information of the query image by using a second learning network model;
   acquire feature information of the obtained generated image by using the first learning network model; and
   update weights of layers respectively included in the first and second learning network models, based on a difference between the feature information of the query image and the feature information of the generated image and on a difference between the query image and the generated image.

8. The neural network training device of claim 7, wherein the at least one processor is further configured to execute the one or more instructions to:
   acquire information about a target class; and
   obtain, based on the feature information of the query image and the information about the target class, a generated image included in the target class by using the second learning network model.

9. The neural network training device of claim 7, wherein the at least one processor is further configured to execute the one or more instructions to iteratively perform the updating until the difference between the feature information of the query image and the feature information of the generated image and the difference between the query image and the generated image are acquired below thresholds respectively preset with respect to the differences therebetween.

10. The neural network training device of claim 9, wherein the at least one processor is further configured to execute the one or more instructions to determine, as a training image for a recognition model for class recognition, a generated image obtained via a second learning network model acquired as a result of the iterative performing of the updating.

11. The neural network training device of claim 7, wherein the at least one processor is further configured to execute the one or more instructions to acquire feature information of a generated image having a smallest difference from the query image from among a plurality of generated images obtained based on the feature information of the query image.

12. The neural network training device of claim 7, further comprising a communication unit,
   wherein the at least one processor is further configured to execute the one or more instructions to control the communication unit to receive, from a server, the feature information of the query image acquired by using the first learning network model stored in the server and to transmit, to the server, the generated image obtained using the second learning network model stored in the neural network training device.

13. A computer-readable recording medium having recorded thereon a program for executing the neural network training method of claim 1 on a computer.

* * * * *